June 24, 1924.  1,498,872
H. B. HAMMILL
APPARATUS FOR COATING ICE CREAM BARS, ETC
Filed Jan. 21, 1922    3 Sheets-Sheet 1
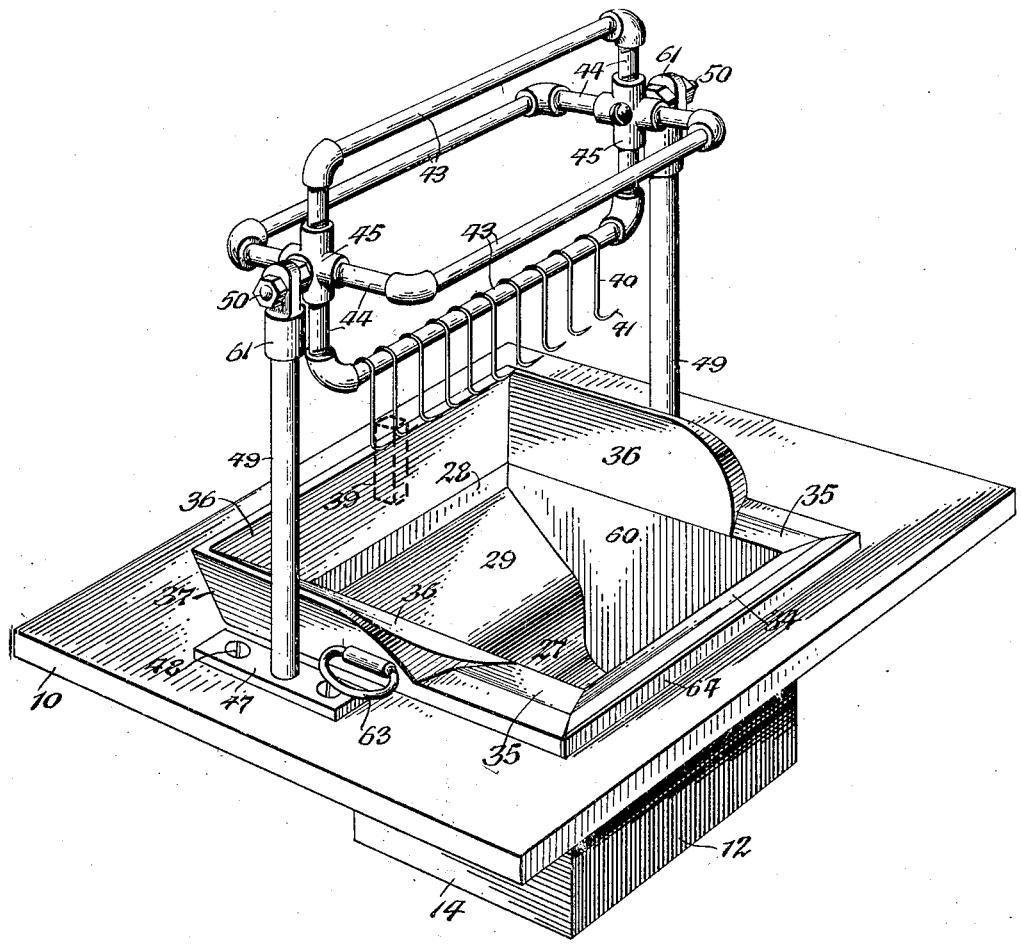

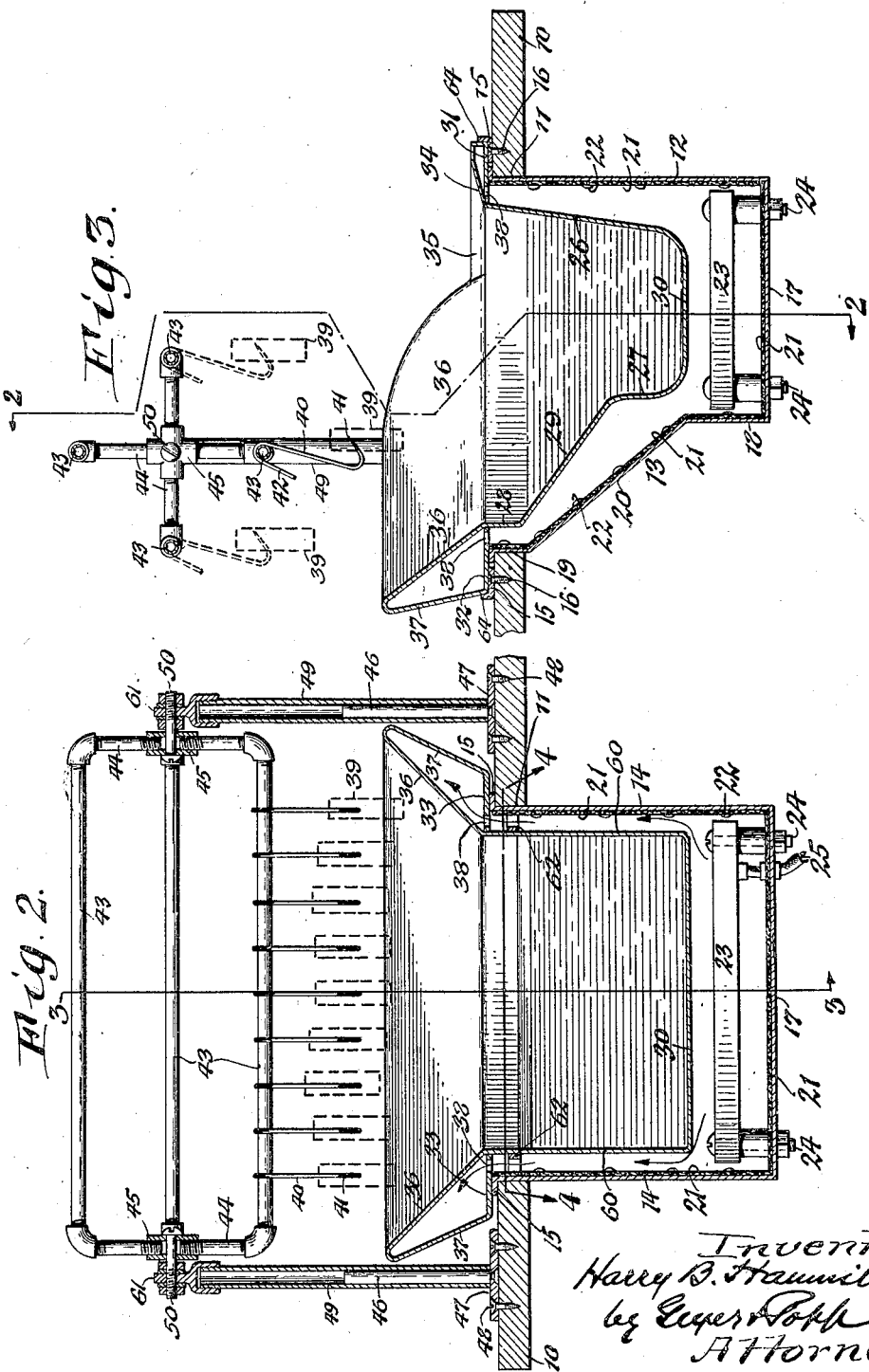

June 24, 1924.
H. B. HAMMILL
1,498,872
APPARATUS FOR COATING ICE CREAM BARS, ETC
Filed Jan. 21, 1922      3 Sheets-Sheet 3
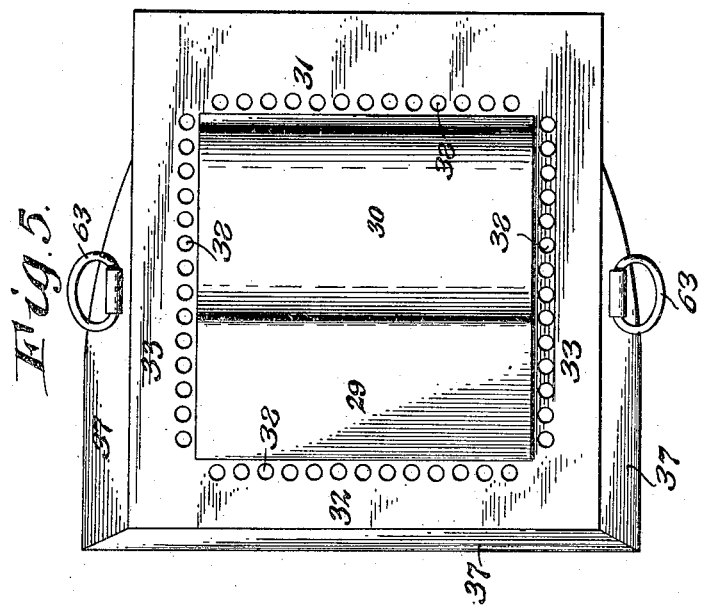
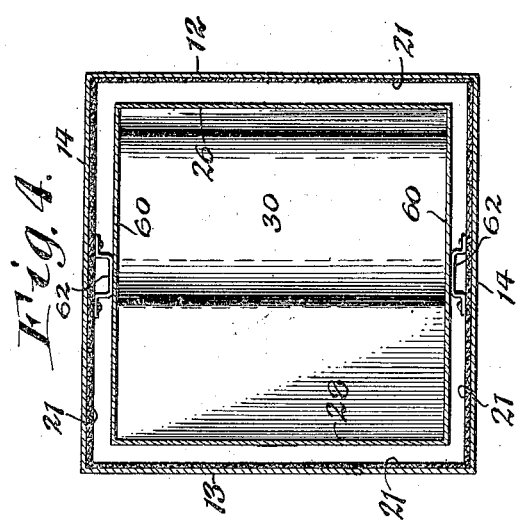
Inventor
Harry B. Hammill
by Geyer & Popp
Attorneys Patented June 24, 1924.

1,498,872

UNITED STATES PATENT OFFICE.

HARRY B. HAMMILL, OF BUFFALO, NEW YORK.

APPARATUS FOR COATING ICE-CREAM BARS, ETC.

Application filed January 21, 1922. Serial No. 530,969.

*To all whom it may concern:*

Be it known that I, HARRY B. HAMMILL, a citizen of the United States, residing at Buffalo, in the county of Erie and State of New York, have invented new and useful Improvements in Apparatus for Coating Ice-Cream Bars, Etc., of which the following is a specification.

This invention relates to an apparatus for coating ice cream bars or cakes or the like with a covering of chocolate or similar material and has for its object the production of such an apparatus of simple and compact construction which permits of expeditiously dipping such bars in a bath of liquid chocolate or the like, and allowing the surplus coating to drip back into the bath without liability of wasting any of the material or producing imperfect goods.

In the accompanying drawings: Figure 1 is a perspective view of the preferred embodiment of my invention. Figure 2 is a vertical longitudinal section of the same taken on line 2—2, Fig. 3. Figure 3 is a vertical cross section thereof taken on line 3—3, Fig. 2. Figure 4 is a horizontal section taken on line 4—4, Fig. 2. Figure 5 is a bottom plan view of the dipping tank.

Similar characters of reference indicate corresponding parts throughout the several views.

This apparatus may be supported in any suitable manner but as shown in the drawings the same is mounted on a horizontal table 10 which is provided with an opening 11, preferably of rectangular form through which the apparatus extends so that parts of the same are above the table and parts below the same.

In its general organization, this apparatus comprises a tank adapted to contain a liquid bath of chocolate or other material with which the bars or cakes are to be coated, a heater whereby the chocolate or the like is maintained in its proper liquid condition, and a reel upon which the coated goods are suspended for a time and permitted to discharge the surplus coating in the form of drippings into the dipping tank where the same may be used on succeeding goods.

The heater may be variously constructed and any suitable heating medium may be employed, such as a gas flame, hot air or water, steam or electricity, but in the example shown in the drawings, an electric air heater is employed which is constructed as follows:

Extending downwardly from the front, rear and side edges of the opening 11 of the table and the front wall 12, rear wall 13 and side walls 14, respectively, of a heating chamber which are provided at their upper edges with outwardly-turned flanges 15 whereby this chamber is supported on the table and which are secured to the same by screws 16, as shown, or any other approved means. The lower edges of the walls of the heating chamber are connected by a horizontal bottom 17. The front and side walls are preferably vertical but the rear wall has a lower vertical part 18 arranged nearer the front wall 19, an upper part which is farther from the front wall, and an inclined intermediate part 20 which extends upwardly and rearwardly from the upper edge of the lower part 18 to the lower edge of the upper part 19. Due to this arrangement of the several walls of the heating chamber, the same is of uniform length from bottom to top but the same enlarges from its bottom toward the top in a direction crosswise of the heating chamber. The walls and bottom of the heating chamber are preferably constructed of sheet metal to retain the heat within the same, the inner side of said walls and bottom are provided with a heat insulating lining 21 of asbestos or the like which is secured thereto by rivets 22 or other suitable means. As an example of one heating device suitable for maintaining the interior of the heating chamber and the parts mounted therein at the proper temperature, an electric heater is employed which is indicated generally by the character 23. This electric heater may be of any well known construction now on the market, the same being preferably secured to the bottom of the heating chamber by bolts 24 and the electric current being supplied to the same by wires 25 from any available source.

Within the upper part of the heating chamber is suspended the dipping tank which is of the same general form as the heating chamber but of smaller dimensions, the same consisting of two parallel side walls 60 arranged transversely adjacent to the inner side of the side walls of the heating chamber, an upright front wall 26 which leans slightly forward, a rear wall having a vertical lower part 27 arranged nearer to the front tank wall, a vertical upper part 28 arranged farther from the front tank wall, an intermediate inclined part 29 extending upwardly and rearwardly from the lower part 27 to the upper part 28, and a horizontal bottom 30 connecting the walls of the tank. The bottom of the tank is spaced from the electric heater and the walls of this tank are spaced from the corresponding walls of the heating chamber, so that a warming jacket is formed around the tank which receives the air heated by the electric heater and maintains the liquid within the tank at the proper consistency for coating the goods dipped into the same to cause the surplus to drip therefrom back into the tank. This tank is preferably removably suspended within the heating chamber by providing the upper edges of the front, rear and side tank walls with laterally projecting horizontal flanges 31, 32, 33, which rest on the corresponding flanges of the heating chamber. Above the front supporting flange 31 of the tank and above the front parts of the side flanges 33 thereof are arranged top plates or rims 34, 35, respectively, which are preferably inclined toward the tank and spaced apart from the corresponding supporting flanges of the tank to form an air jacket therebetween, and above the rear supporting flange 32 of the tank and the rear parts of the side flanges 33 thereof, are arranged deflectors having inner walls 36 which incline upwardly and outwardly at a considerable angle from the upper edge of the rear and side tank walls and outer walls 37 which are only slightly inclined and extend upwardly and outwardly from the outer edges of the rear and side tank flanges 32, 33, to the upper edges of the inner walls 36 and thereby form air jackets above the respective flanges of the tank. Communication is established between the air jackets above the supporting flanges of the tank and the air spaces between the walls of the tank and the heating chamber by means of a plurality of openings 38 formed in the supporting flanges within the inner side of the walls of the heating chamber, as shown in Figs. 2 and 3.

By this means the contents of the tank is maintained in the proper liquid condition and the top plates and inner walls of the deflectors are kept warm by the heated air from the electric heater, so that any chocolate or other material falling on the inclined top plates and inner deflector walls will remain in a fluid state and enable the same to drain back into the tank to be again used for coating goods. The tank may be held in its central position within the heating chamber by any suitable means, for instance, by cleats 62 arranged on the side walls of the heating chamber and engaging with the side walls of the tank, as shown in Figs. 2 and 4, and by lugs 64 on the front and rear flanges 15 of the heating chamber and engaging with the corresponding flanges of the tank, as shown in Fig. 3. For convenience in manipulating the tank when lifting the same out of the heater and lowering the same therein, the opposite sides of the tank may be provided with handles 63.

The articles or goods to be dipped and coated may be of any suitable shape, and material, for instance, as shown at 39 in Figs. 1, 2 and 3, the same may have the form of bars of ice cream which are to be coated with chocolate of which a liquid batch is contained in the tank. These are adapted to be suspended upon the dripping reel forming part of my invention by means of a plurality of hangers each of which consists of an upright rod 40 provided at its lower end with a forwardly-projecting hook 41 which is adapted to stick into a bar of ice cream for holding the same while the bar is being dipped into the chocolate bath in the tank and the upper end of this rod being provided with a rearwardly-projecting hook 42 which is adapted to engage one of the suspension bars of the reel and be held thereon for a sufficient length of time over the tank and associated parts until the surplus chocolate deposited on the ice cream bar has run off from the same and dripped back into the tank.

This dripping reel in its preferred form comprises a plurality of horizontal supporting or suspension bars 43, preferably four in number, which are arranged in an annular row and lengthwise above the rear part of the tank and the inner wall of the deflector, radial arms 44 connected at their outer ends with the opposite ends of the supporting bars, and hubs 45 connected with the inner ends of said arms and turning about a horizontal longitudinal axis. The hubs are pivotally supported on the upper ends of standards which are mounted on the table on opposite sides of the tank and heater which standards are preferably so constructed that the reel may be readily removed for cleaning, inspecting and repairing the apparatus. For this purpose, each of the standards preferably comprises an upright lower rod section 46 which is provided at its lower end with a base 47 secured to the top of the table by screws and an upper tubular section 49 which slips over the lower section and is provided at its upper end with a head 61 to which the adjacent reel hub is pivoted by a horizontal longitudinal bolt 50.

During the operation of coating ice cream bars the attendant first dips bars of ice cream successively by means of the hangers into the chocolate bath and then hangs them preferable one at a time on the foremost supporting bar of the reel until the same has been loaded with the desired number, after which the reel is turned manually in the direction for causing the foremost supporting bar and its row of coated ice cream bars to move downwardly and rearwardly. The attendant now proceeds to load the next following supporting bar which has moved from the top to the front of the reel with coated ice cream bars, and when this has been done the reel is again turned one step as before, thereby bringing the first loaded supporting bar to the rear. The time elapsing between loading of the ice cream bars on a supporting bar while the same occupies the foremost position on the reel until the same reaches the rearmost position on the reel has been found sufficient to permit the surplus liquid chocolate on the ice cream bars to drip therefrom and be conducted by the deflector and inclined rear wall of the tank into the deep front part of the latter and leave these goods in a sufficiently hard or dry condition that upon reaching the rear side of the reel they can be properly handled by the attendant for removing the same from the reel bars and packing the same in trays or cartons ready for the trade.

The pivotal connection between the reel and its standards is preferably sufficiently tight that the reel will be held frictionally in place while being loaded and unloaded but can be operated freely by hand for turning the same step by step as the loading and unloading of successive reel bars proceeds and an empty bar is successively moved from the rear side to the front side of the reel.

The position of this reel relative to the dipping tank produces a very compact structure which permits of removing and recovering the surplus chocolate from the dipped bars without carrying the same to another place for this purpose, as has been the custom heretofore, but instead permits of packing the same without requiring repeated handling.

Furthermore, by delivering the drippings of the surplus chocolate in the tank immediately after the dipping operation, the chocolate always remains of the proper consistency for properly coating the bar and little, if any, of the chocolate is splashed outside of the tank and its rim, so that the apparatus is not only very economical, owing to the absence of waste, but the same is also very sanitary and requires comparatively little labor to keep the same clean.

I claim as my invention:

1. An apparatus of the character described, comprising a tank adapted to receive a coating material, a reel arranged above the tank and comprising a plurality of horizontal longitudinal bars adapted to support the dippped articles, standards arranged at opposite ends of the bars and each having a low stationary section, an upper section slidable on the lower section, and hubs pivotally mounted on the upper standard sections and carrying said bars at the ends thereof.

2. An apparatus of the character described, comprising a heating chamber and a tank arranged in said chamber but having its walls spaced from the walls of said chamber and provided around its upper end with a heating jacket which rests removably on the upper end of said chamber and which is provided on its underside with perforations whereby communication is established between said jacket and the space between the walls of said tank and chamber.

3. An apparatus of the character described, comprising a tank adapted to contain a bath of coating material, a low jacketed rim arranged around the upper front part of said tank and a high jacketed deflector arranged around the upper front part of said tank.

4. An apparatus of the character described, comprising a tank adapted to contain a bath of coating material, a low jacketed rim arranged around the upper front part of said tank and a high jacketed deflector arranged around the upper front part of said tank, and said rim and deflector having inclined surfaces which slope toward the tank.

HARRY B. HAMMILL.